(12) United States Patent
Serencsits et al.

(10) Patent No.: US 11,772,303 B2
(45) Date of Patent: Oct. 3, 2023

(54) TOOLS FOR FORMING A COMPOSITE PART AND ASSOCIATED METHODS

(71) Applicant: The Boeing Company, Chicago, IL (US)

(72) Inventors: William L. Serencsits, Charleston, SC (US); Tara K. Baker, Charleston, SC (US)

(73) Assignee: The Boeing Company, Arlington, VA (US)

( * ) Notice: Subject to any disclaimer, the term of this patent is extended or adjusted under 35 U.S.C. 154(b) by 206 days.

(21) Appl. No.: 16/821,942

(22) Filed: Mar. 17, 2020

(65) Prior Publication Data

US 2021/0291407 A1    Sep. 23, 2021

(51) Int. Cl.
   *B29C 33/02*    (2006.01)
   *B29C 33/04*    (2006.01)

(52) U.S. Cl.
   CPC .............. *B29C 33/02* (2013.01); *B29C 33/04* (2013.01)

(58) Field of Classification Search
   CPC ... B29C 2033/023; B29C 33/02; B29C 33/04; B29C 33/046; B29C 33/307; B29D 24/005

See application file for complete search history.

(56) References Cited

U.S. PATENT DOCUMENTS

| | | | | |
|---|---|---|---|---|
| 3,862,280 A | * | 1/1975 | Polovina | C03C 25/27 428/178 |
| 2003/0106890 A1 | * | 6/2003 | Matsen | B29C 33/02 219/647 |
| 2009/0191345 A1 | * | 7/2009 | Griffith | B29C 70/30 427/314 |
| 2010/0230575 A1 | * | 9/2010 | Mironov | B29C 33/02 249/78 |
| 2013/0113141 A1 | * | 5/2013 | Sorensen | B29C 33/02 264/404 |
| 2019/0168433 A1 | * | 6/2019 | Hughes | B29C 33/02 |
| 2020/0164548 A1 | | 5/2020 | Voss et al. | |

OTHER PUBLICATIONS

U.S. Appl. No. 16/201,612, filed Nov. 27, 2018.

* cited by examiner

*Primary Examiner* — Yunju Kim
(74) *Attorney, Agent, or Firm* — Kunzler Bean & Adamson

(57) ABSTRACT

Disclosed herein is a tool for forming a composite part. The tool comprises a first layer, a second layer, spaced apart from the first layer, and a low-density core interposed between the first layer and the second layer. The low-density core has a density less than the first layer and the second layer and comprises a plurality of empty cells at least partially defined by the first layer and the second layer. The tool also comprises a heating source and one of: each one of the plurality of empty cells extends across a width or length of the first layer and the second layer; or adjacent ones of the plurality of empty cells are fluidically interconnected by a fluid port formed in the low-density core.

20 Claims, 9 Drawing Sheets

TOOLS FOR FORMING A COMPOSITE PART AND ASSOCIATED METHODS

FIELD

This disclosure relates generally to forming composite part, and more particularly to using a heating tool to form a composite part.

BACKGROUND

Forming composite parts with a shaping tool requires thermal uniformity at the part-interface surface of the tool. Support structures in conventional composite shaping tools help to stiffen the tool, but also tend to act as a heat sink, which makes uniform heating of the part-interface surface difficult and/or time consuming. Non-uniform heating of a tool can lead to incomplete forming of the composite part and reduced part quality. Moreover, non-uniform heating of the tool may increase the time required to bring the entire part-interface surface to a minimum form temperature. Accordingly, a tool for forming composite parts that promotes uniform heating of the tool in a timely and efficient manner is desired.

SUMMARY

The subject matter of the present application provides examples of tools and methods for forming composite parts that overcome the above-discussed shortcomings of prior art techniques. The subject matter of the present application has been developed in response to the present state of the art, and in particular, in response to shortcomings of conventional tools, and the conventional methods of forming a composite part.

Disclosed herein is a tool for forming a composite part. The tool comprises a first layer, comprising a part-interface surface and a core-interface surface. The part-interface surface being opposite the core-interface surface. The tool also comprises a heating element that is coupled to the first layer. The heating element is configured to supply heat to the first layer. The tool additionally comprises a second layer that is spaced apart from the first layer. The tool further comprises a low-density core that is interposed between the first layer and the second layer. The low-density core has a density less than the first layer and the second layer and the low-density core comprises a plurality of empty cells at least partially defined by the first layer and the second layer. One of the plurality of empty cells extends across a width or a length of the first layer and the second layer; or adjacent ones of the plurality of empty cells are fluidically interconnected by a fluid port formed in the low-density core. The preceding subject matter of this paragraph characterizes example 1 of the present disclosure.

The tool further comprises a backup support structure attached to the second layer. The preceding subject matter of this paragraph characterizes example 2 of the present disclosure, wherein example 2 also includes the subject matter according to example 1, above.

The tool further comprises a fluid manifold fluidically coupled with the low-density core. The fluid manifold is configured to force a gas into and through the low-density core. The preceding subject matter of this paragraph characterizes example 3 of the present disclosure, wherein example 3 also includes the subject matter according to any one of examples 1 or 2, above.

The gas has a temperature less than or higher than the first layer. The preceding subject matter of this paragraph characterizes example 4 of the present disclosure, wherein example 4 also includes the subject matter according to example 3, above.

The fluid manifold is operable to modulate a temperature of the gas forced into and through the low-density core between a first temperature lower than the first layer and a second temperature higher than the first layer. The preceding subject matter of this paragraph characterizes example 5 of the present disclosure, wherein example 5 also includes the subject matter according to any one of examples 3 or 4, above.

The low-density core comprises a honeycomb structure. The preceding subject matter of this paragraph characterizes example 6 of the present disclosure, wherein example 6 also includes the subject matter according to any one of examples 1-5, above.

The honeycomb structure at least partially defines the plurality of empty cells. Each one of the plurality of empty cells has a polygonal-shaped cross-section. The honeycomb structure comprises a plurality of fluid ports. Each one of the plurality of fluid ports of the honeycomb structure fluidically interconnects a corresponding set of adjacent ones of the plurality of empty cells. The preceding subject matter of this paragraph characterizes example 7 of the present disclosure, wherein example 7 also includes the subject matter according to example 6, above.

The honeycomb structure comprises sidewalls that partially define the plurality of empty cells. The plurality of fluid ports are defined by apertures formed in the sidewalls of the honeycomb structure. The preceding subject matter of this paragraph characterizes example 8 of the present disclosure, wherein example 8 also includes the subject matter according to example 7, above.

The low-density core comprises a corrugated panel having a plurality of corrugations. Each one of the corrugations defines a corresponding one of the plurality of empty cells that extend across the width or length of the first layer and the second layer. The preceding subject matter of this paragraph characterizes example 9 of the present disclosure, wherein example 9 also includes the subject matter according to any one of examples 1-5, above.

The low-density core comprises a plurality of corrugated strips spaced apart from each other along the width or length of the first layer and the second layer. Each one of the corrugated strips comprises a plurality of corrugations. Each one of the plurality of empty cells that extend across the width or length of the first layer and the second layer is defined between corresponding adjacent ones of the plurality of corrugated strips. The preceding subject matter of this paragraph characterizes example 10 of the present disclosure, wherein example 10 also includes the subject matter according to any one of examples 1-5, above.

The heating element comprises a resistive heating element integrated into the first layer. The preceding subject matter of this paragraph characterizes example 11 of the present disclosure, wherein example 11 also includes the subject matter according to any one of examples 1-10, above.

The heating element comprises an inductive heating element integrated into the first layer. The preceding subject matter of this paragraph characterizes example 12 of the present disclosure, wherein example 12 also includes the subject matter according to any one of examples 1-10, above.

The first layer is made of a composite material and comprises an upper composite layer and a lower composite layer. The heating element is interposed between the upper composite layer and the lower composite layer. The preceding subject matter of this paragraph characterizes example 13 of the present disclosure, wherein example 13 also includes the subject matter according to any one of examples 1-12, above.

The first layer is made of a metallic material. The heating element is coupled to the core-interface surface of the first layer. The preceding subject matter of this paragraph characterizes example 14 of the present disclosure, wherein example 14 also includes the subject matter according to any one of examples 1-13, above.

The part-interface surface of the first layer has at least one contour. The at least one contour of the part-interface surface of the first layer corresponds with a contour of the composite part. The preceding subject matter of this paragraph characterizes example 15 of the present disclosure, wherein example 15 also includes the subject matter according to any one of examples 1-14, above.

A fluid is flowable through the low-density core from one side of the low-density core to an opposite side of the low-density core by one of flowing along a same one of the plurality of empty cells extending across the width or length of the first layer and the second layer or flowing through multiple ones of the plurality of empty cells via a plurality of fluid ports formed in the low-density core. The preceding subject matter of this paragraph characterizes example 16 of the present disclosure, wherein example 16 also includes the subject matter according to any one of examples 1-5 or 11-15, above.

Also disclosed herein is a tool for forming a composite part. The tool comprises a first layer, comprising a part-interface surface and a core-interface surface. The part-interface surface is opposite the core-interface surface. The tool also comprises a heating element that is coupled to the first layer. The heating element is configured to supply heat to the first layer. The tool also comprises a second layer, spaced apart from the first layer. The tool additionally comprises a honeycomb core that is interposed between the first layer and the second layer. The honeycomb core comprises a plurality of empty cells having a polygonal-shaped cross-section and is at least partially defined by the first layer and the second layer. The tool further comprise a plurality of fluid ports in the honeycomb core. Each one of the plurality of fluid ports fluidically interconnects a corresponding set of adjacent ones of the plurality of empty cells. The preceding subject matter of this paragraph characterizes example 17 of the present disclosure.

Further disclosed herein is a method of forming a composite part. The method comprises locating an unheated composite material on a first layer of a tool. The tool comprises the first layer and a second layer, spaced apart from the first layer, a low-density core, interposed between the first layer and the second layer and having a density less than the first layer and the second layer. The low-density core comprises a plurality of empty cells at least partially defined by the first layer and the second layer. The tool also comprises a heating source. The method further comprises heating the unheated composite material, to form a heated composite part. Additionally, the method comprises cooling the heated composite part. The preceding subject matter of this paragraph characterizes example 18 of the present disclosure.

The heating source is a heating element coupled to the first layer. The step of heating the unheated composite material comprises activating the heating element coupled to the first layer. The step of cooling the forming composite part comprises deactivating the heating element coupled to the first layer. The preceding subject matter of this paragraph characterizes example 19 of the present disclosure, wherein example 19 also includes the subject matter according to example 18, above.

The heating source is a fluid manifold fluidically coupled with the low-density core. The step of heating the unheated composite material comprises using the fluid manifold to flow a heated gas through the plurality of empty cells of the low-density core of the tool. The step of cooling the forming composite part comprises using the fluid manifold to flow a cooled gas through the plurality of empty cells of the low-density core of the tool. The preceding subject matter of this paragraph characterizes example 20 of the present disclosure, wherein example 20 also includes the subject matter according to any one of examples 18 or 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
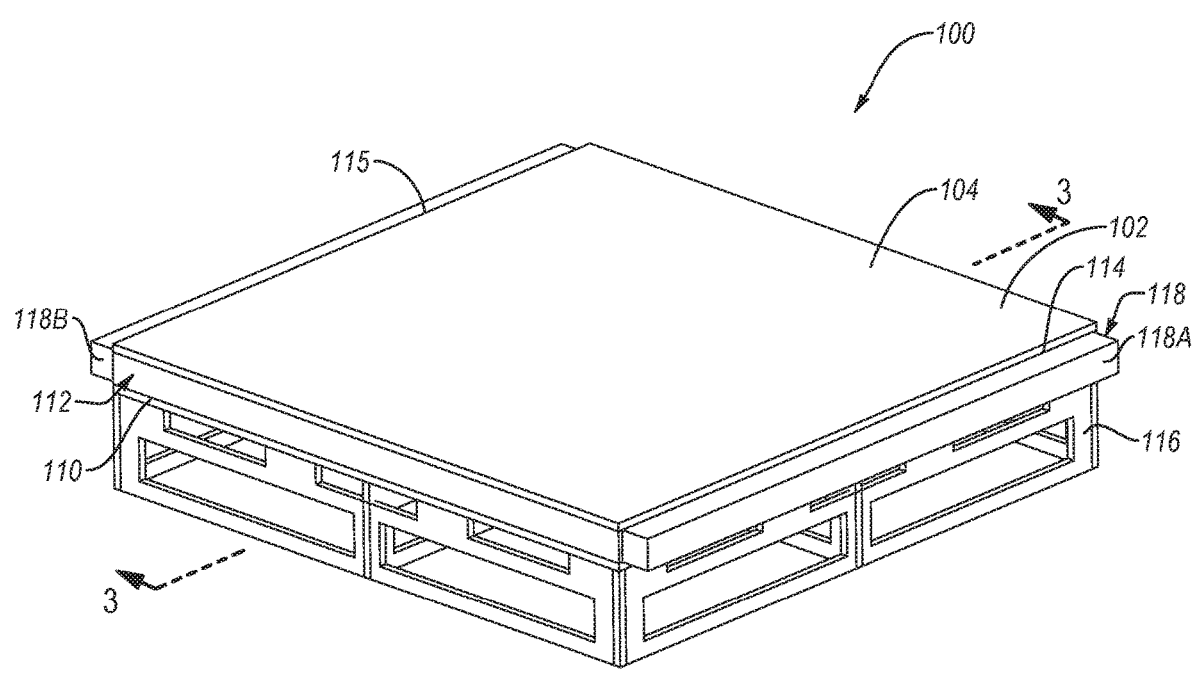
FIG. 1 is a schematic perspective view of a tool for forming a composite part, according to one or more examples of the present disclosure.

Referring to FIG. 1, and according to some examples, a tool 100 for forming a composite part 101 (see, e.g., FIG. 2) includes a first layer 102, a low-density core 112, and a second layer 110. The first layer 102 includes a part-interface surface 104 and a core-interface surface 106 (see, e.g., FIG. 2). The part-interface surface 104 and the core-interface surface 106 are on opposite sides of the first layer 102. The part-interface surface 104 is configured to interface with and support a composite material that is to be formed into a composite part 101 by the tool 100. The part-interface surface 104 provides a rigid surface on which the composite material is supported while the tool 100 heats the composite part 101. Accordingly, the part-interface surface 104 is flat in some examples, but can be contoured to correspond with a contour of the composite part 101 in other examples.

In conventional tools, due to the thermal effects of ancillary parts of the tool, such as a support structure, heat received from a heating source, although uniformly distributed upon receipt, may not be uniformly distributed throughout the tool. In some cases, the support structure of conventional tools creates a heat sink, which cools the temperature of the tool at attachment points of support structure to the tool and increases the potential for thermal gradients across a part-interface surface of the tool. The resulting thermal gradient can include temperature variations across the part-interface surface of the tool of between 20 to 30 degrees Fahrenheit, or more. Non-uniform distribution of heat through a tool and along the part-interface surface of the tool can result in a non-uniform transfer of heat to the composite part. Non-uniform transfer of heat can cause incomplete heating (e.g., curing) of the composite part and a reduction in the quality of the heated composite part. Additionally, uneven temperature distribution may cause an increase in the time required to bring the entire tool or a useable portion of the tool to a minimum forming temperature (e.g., a minimum cure temperature).

The tool 100 of the present disclosure is configured to help reduce thermal gradients in the part-interface surface 104 and non-uniform transfer of heat to the composite part 101 being heated, which helps promote complete heating, and thus forming, of the composite part 101 and increases the quality of the heated composite part 101. Furthermore, the reduction in thermal gradients can decrease the time required to heat the tool 100 to the minimum forming temperature. To this end, the tool 100 includes a low-density core 112 to help insulate the part-interface surface 104 of the tool 100 from thermal effects of ancillary parts of the tool 100, such as a backup support structure 116. Therefore, any heat loss from the heating source will be more evenly distributed across the part-interface surface 104 because the low-density core 112 reduces heat loss concentrations at attachment points of ancillary parts in the tool 100, such as the backup support structure 116. In some examples, a high-quality thermal uniformity is a thermal gradient in the part-interface surface 104 of plus or minus 10 degrees Fahrenheit. In other examples, a high-quality thermal uniformity is a thermal gradient in the part-interface surface 104 of plus or minus 5 degrees Fahrenheit.

The low-density core 112 is interposed between the first layer 102 and the second layer 110. The low-density core 112 has a density less than the density of the first layer 102 and less than the density of the second layer 110. Furthermore, the low-density core 112 has a plurality of empty cells 130. The empty cells 130 are at least partially defined by the first layer 102 and the second layer 110, such as by enclosing a top and bottom of the empty cells 130. Various example empty cells are possible and are described in more detail below. For instance, different examples of empty cells 130 are described in detail with reference to FIGS. 6, 7, and 8. As used herein, an empty cell 130 is a space through which a fluid, such as a gas (e.g., air) or a liquid, is allowed to flow without physical obstruction. Accordingly, an empty cell 130 is still an empty cell 130 even if there is a fluid present in the empty cell 130.

Figure 5:
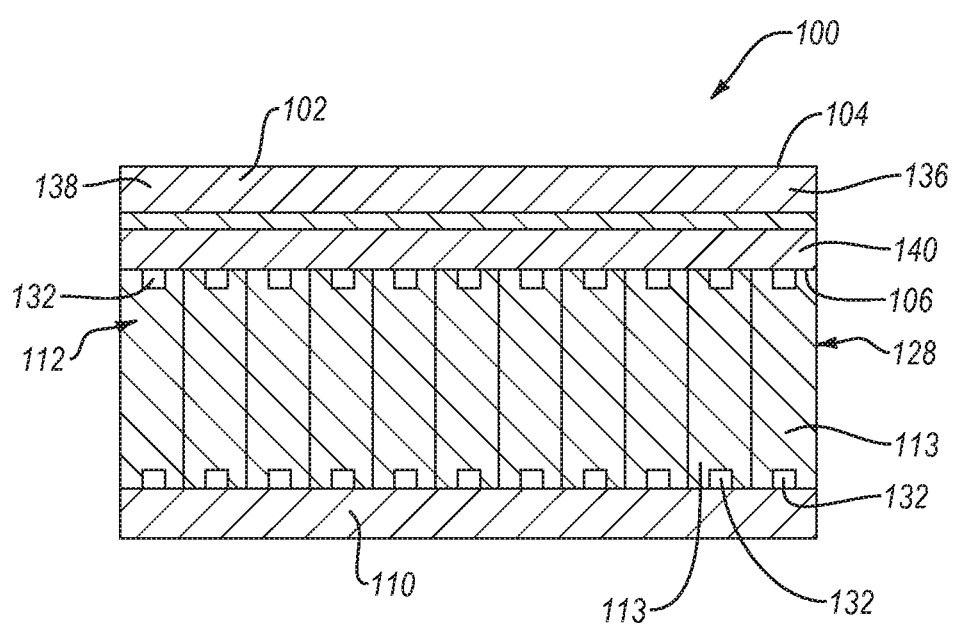
FIG. 5 is a schematic cross-sectional side view of a tool for forming a composite part, according to one or more examples of the present disclosure.
Figure 6:
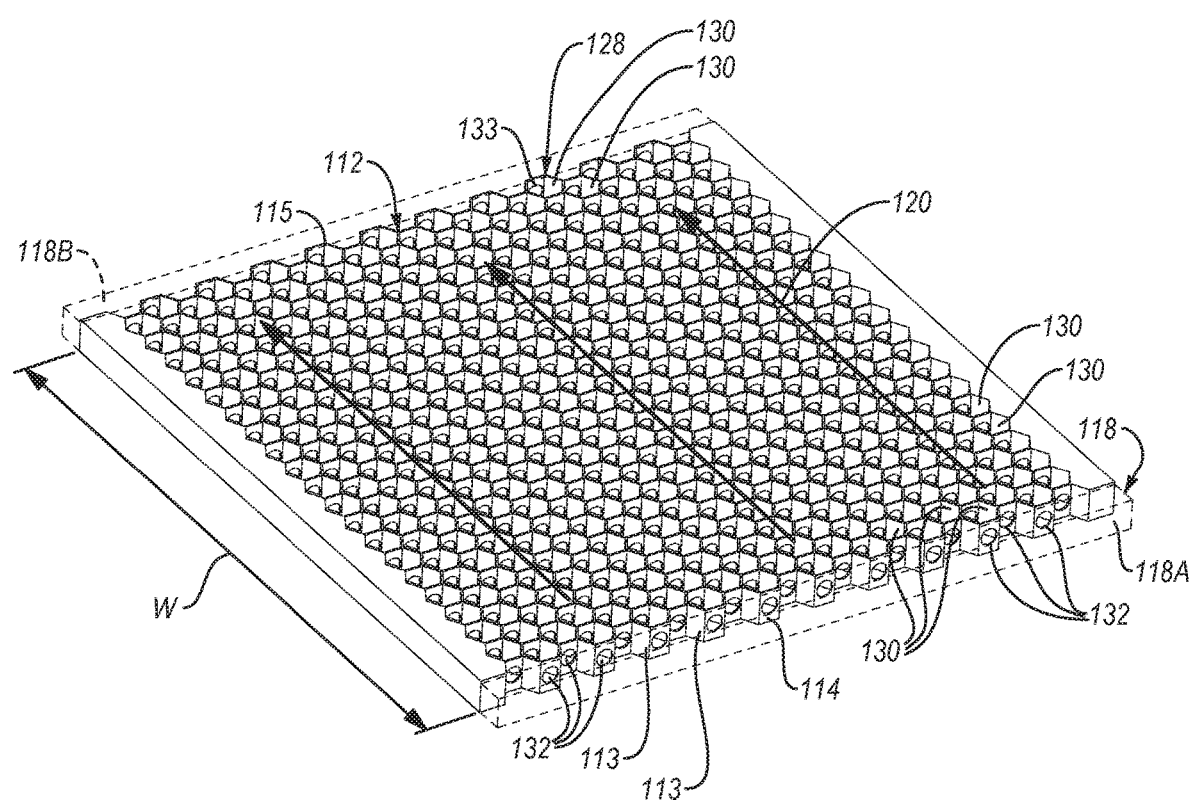
FIG. 6 is a schematic perspective view of a low-density core, according to one or more examples of the present disclosure.

In some examples, adjacent cells or multiple ones of the plurality of empty cells 130 are fluidically interconnected by a fluid port 132 formed in the low-density core 112 (see, e.g., FIG. 6). In some examples, each one of the plurality of empty cells 130 extend across an entirety of a width or length of the first layer 102 and the second layer 110 (see, e.g., FIGS. 7 and 8). Additionally, in some examples, adjacent ones of the plurality of empty cells 130 that extend across an entirety of the width or length of the first layer 102 and the second layer 110 can be further fluidically interconnected by fluid ports 132 in the low-density core 112 (see, e.g., FIG. 8). As used herein, an entirety of a width or length can include the entire width or length or at least 90% of the entire width or length. Referring to FIGS. 3-6, the low-density core 112 has a honeycomb structure 128, that defines the plurality of empty cells 130, in some examples. However, in other examples, such as shown in FIGS. 7 and 8, the low-density core 112 has a corrugated configuration of corrugations 126 that define the empty cells 130. The corrugations 126 of the corrugated configuration may extend lengthwise parallel with the first layer 102 and the second layer 110. Alternatively, the corrugations 126 of the corrugated configuration are defined by a plurality of corrugated strips 150 that extend lengthwise perpendicular to the first layer 102 and the second layer 110. These examples are explained in more detail below.

Referring to FIG. 1, the tool 100 includes a fluid manifold 118. The fluid manifold is fluidically coupled with the low-density core 112. The fluid manifold 118 is configured to force a gas 120 (see, e.g., FIG. 6) into and through the low-density core 112. In other words, the fluid manifold 118 is coupled to the low-density core 112 such that the fluid manifold 118 can force gas 120 into and through the plurality of empty cells 130 of the low-density core 112. In one example, a fluid manifold inlet 118A of the fluid manifold 118 is attached to a first side 114 of the low-density core 112 and a fluid manifold outlet 118B of the fluid manifold 118 is attached to a second side 115 of the low-density core 112. The first side 114 of the low-density core 112 is opposite the second side 115 of the low-density core 112. The plurality of empty cells 130 are configured so that the fluid manifold inlet 118A can force the gas 120 into and through the plurality of empty cells 130 and the fluid manifold outlet 118B can receive and expel the gas 120 from the plurality of empty cells 130. Accordingly, the fluid manifold inlet 118A and the fluid manifold outlet 118B work together to force gas 120 into and through the low-density core 112. In certain examples, the gas 120 from the fluid manifold outlet 118B is recycled back into the low-density core 112 by heating or cooling the gas 120 and then reintroducing the gas 120 back into the fluid manifold inlet 118A, thus creating a circular motion of gas 120 into and out of the low-density core 112. Accordingly, fluid is flowable through the low-density core 112 from one side of the low-density core 112 to an opposite site of the low-density core 112. The flow of the gas 120 into and out of the low-density core 112 can help maintain a desired temperature of the gas 120 within the low-density core 112. Additionally, the flow rate of the gas 120 through the low-density core 112 can be adjusted and controlled via the fluid manifold 118.

In alternative examples, the fluid manifold 118 of the tool 100 includes only the fluid manifold inlet 118A. In other words, in such examples, the fluid manifold 118 of the tool 100 does not include the fluid manifold outlet 118B. Accordingly, on the second side 115 of the low-density core 112 the empty cells 130 of the low-density core 112 are exposed to the environment. In this manner, the fluid manifold inlet 118A forces gas 120 into the through the plurality of empty cells 130 and the gas 120 exits the exposed empty cells 130 of the plurality on the second side 115 of the low-density core 112 into the environment, rather than being recycled.

The gas 120 (e.g. air or other gas), received from the fluid manifold 118, has a temperature that is different (e.g., less than or higher) than the first layer 102 in order to change a temperature of the first layer 102. In some examples, the fluid manifold 118 is operable to modulate the temperature of the gas 120 forced into the through low-density core 112 between a first temperature lower than the first layer 102 and a second temperature higher than the first layer 102. Accordingly, in such examples, the gas 120 generated by the fluid manifold 118 and supplied to the tool 100 is regulated to help heat or cool the tool 100 to a desirable temperature. In one example, the gas 120 is used to heat or cool the tool 100 without separate heaters or coolers (e.g., without a heating element 108). In such an example, while an unheated composite material is on the part-interface surface 104, heat from only the gas 120 is transferred to the composite part 101 to heat the unheated composite material into a heated composite material and ultimately the composite part 101. Accordingly, as used herein the terms composite part and heated composite part can be interchangeable.

Alternatively, in other examples, the heat from the gas 120 is used in combination with heat from the heating element 108. Accordingly, in such examples, heat from two heat sources (i.e. heat from the gas 120 and the heat from at least one heating element 108) are supplied to the tool 100 and transferred to the unheated composite material to heat the unheated composite material and form the composite part 101. Additionally, in some examples, after the composite part 101 has been heated and while the composite part 101 is on the part-interface surface 104, cooling gas 120 from the fluid manifold 118 is used to cool the composite part 101.

Figure 2:
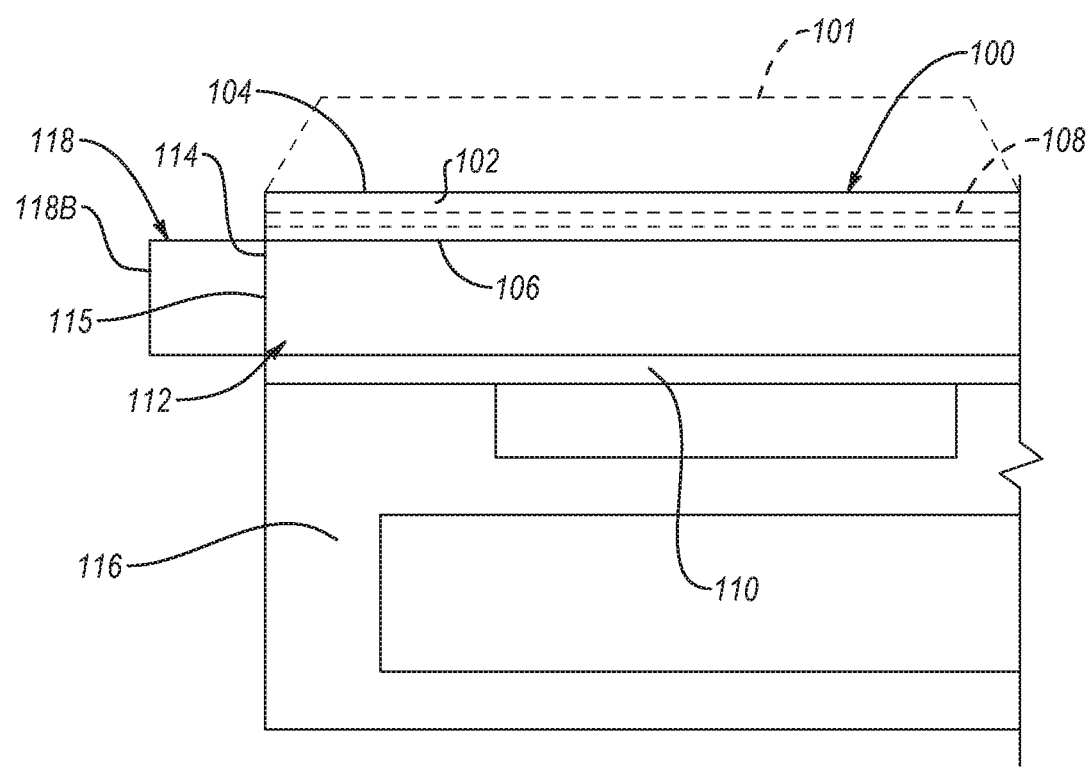
FIG. 2 is a schematic side view of the tool of FIG. 1 with a composite part on the tool, according to one or more examples of the present disclosure.

As shown in FIGS. 1 and 2, the backup support structure 116 is attached to the second layer 110 of the tool 100. The backup support structure 116 is thermally insulated from the part-interface surface 104 by the low-density core 112. The backup support structure 116 is used to maintain structural stability (e.g., rigidity) to the tool 100. Structural stability in the tool 100 is important while composite parts 101 are being heated on the tool 100, to ensure accuracy and quality of the composite part 101, and during transportation and storage of the tool 100, to protect and maintain the effectiveness of the tool 100. The backup support structure 116 can be of any configuration that provides the necessary structural stability to the tool 100. Often, the backup support structure 116 is made of a metallic material with a relatively high thermal conductivity, which emphasizes the need to thermally insulate the backup support structure 116 from the part-interface surface 104. In some examples, the low-density core 112 provides sufficient structural stability, such as in a direction perpendicular to the first layer 102, such that a backup support structure 116 is not needed.

Referring to FIG. 2, the tool 100 includes a heating element 108 that is coupled to the first layer 102. The heating element 108 is configured to generate heat and configured to supply heat to the part-interface surface 104. The coupling is facilitated by direct contact between the heat element 108 and the first layer 102. The heating element 108, in one example, has a flat surface that helps to uniformly transfer heat to the part-interface surface 104. In other examples, the heating element 108 has a contoured surface that corresponds to the contour in the first layer 102 (see, e.g., FIG. 9). In other words, in some examples, the heating element 108 is a consistent distance from the part-interface surface 104 along the part-interface surface 104 to help uniformly transfer heat across most if not all of the part-interface surface 104. The heating element 108 generates heat with integral heat generating elements, such as resistance heaters, magnetic induction heaters, and the like, in certain examples. In other examples, the heating element 108 generates heat by receiving heat from a heat source, external to the heating element 108. Such an external heat source can be any of various heat sources known in the art.

The heat, received from the heating element 108, heats the part-interface surface 104 to a temperature corresponding with a desired forming temperature of the composite part 101. Accordingly, the heat generated by the heating element 108 and supplied to the tool 100 is regulated to heat the tool 100 to the desirable forming temperature. While an unheated composite material is on the part-interface surface 104, heat from the tool 100 is transferred to the unheated composite material to heat the composite part 101 to the desired forming temperature of the composite part 101. In some examples, even those examples that include the fluid manifold 118, the heat necessary to heat the tool 100, in order to heat the unheated composite material to the desired forming temperature of the composite part 101, is supplied by only the heating element 108. In other words, in some examples, the gas 120 is not used to heat the tool 100.

The composite material, and thus the composite part 101, is made from a fiber-reinforced polymer in some examples. The polymer of the composite material is a thermoset material in some examples and is a thermoplastic material in other examples. In the case of the thermoset material, the desired forming temperature is a cure temperature of the thermoset material. In contrast, in the case of the thermoplastic material, the desired forming temperature is a melting temperature or heat deflection temperature of the thermoplastic material. Accordingly, as used in several examples herein, the part forming process promoted by the tool 100 is for forming processes performed at temperatures at or above melting temperatures, heat deflection temperatures, and curing temperatures of the composite material, depending on whether the composite material includes a thermoplastic material or a thermoset material. Therefore, the term forming is interchangeable with melting, heat deflecting, and curing depending on the type of material being formed. In the case of thermoset materials, in some examples, the forming temperature is a curing temperature, which can be at or above 360 degrees Fahrenheit.

In some situations, the tool 100 may induce an exothermic reaction in the composite part 101 during its forming. For example, a composite part 101 having a relatively high thickness or a composite part 101 with varying thicknesses is particularly susceptible to exothermic reactions. During the forming process, heat is generated by the chemical reactions in the composite part 101 itself. When the heat in the composite part 101 cannot escape, as in the case of some thick composite parts, the heat builds up within the composite part 101 causing the composite part 101 to heat faster in areas experiencing exotherm. Faster forming because of internal heat from the composite part 101 generates even more heat and can result in an uncontrolled exotherm. An uncontrolled exotherm can result in an uneven or incomplete heating (e.g., cure) of the composite part 101. In some examples, an uncontrolled exotherm causes the composite material to overheat, which can result in sub-optimal mechanical properties of the composite part 101 after the composite part 101 is formed. To avoid or help control exothermic reactions, the fluid manifold 118 can be operated to modulate the temperature of the gas 120 into and through the low-density core 112. Cooling gas 120 can be forced into the low-density core 112 to lower the temperature of the part-interface surface 104 and the composite part 101. Accordingly, the temperature of the gas 120 in the fluid manifold 118 can be adjusted as necessary to aid in exotherm mitigation.

In some examples, the tool 100 is capable of forming the composite part 101 without the aid of, or without being within, an autoclave. Conventionally, composite parts are heated using very slow heating rates (e.g. 1-2 degrees Fahrenheit per minute) in an autoclave, which allows a composite part and any attached tools to heat evenly. The heating process in the autoclave is slow and can take around 5 hours to heat from 70 degrees Fahrenheit to 360 degrees Fahrenheit at a rate of 1 degree per minute. Alternatively, the tool 100 can heat a composite part 101 at a faster rate than conventional autoclaves. For example, the tool 100 may be heated at a rate of 10 degrees Fahrenheit per minute or higher by a heat source in the tool 100. In one example, the heat source is the heating element 108 coupled to the first layer of the tool 100. In another example, the heat source is the fluid manifold 118 coupled to the low-density core 112 and forcing heated gas 120 into the through the low-density core 112. Additionally, the heat source can be both the heating element 108 and the heated gas 120. In certain examples, the tool 100 is used in an environment that is at ambient temperature (e.g., 70 degrees Fahrenheit). Alternatively, in other examples, the tool 100 is used in an environment that is at a temperature higher than ambient temperature (e.g. 100 degrees Fahrenheit). In other examples, the tool 100 is used in an environment that is pressurized. Furthermore, the tool 100 can be used in both a heated and pressurized environment. In other words, the tool 100 can be used in an environment to help facilitate heating of the part-interface surface 104 and the composite part 101.

Alternatively, in certain examples, the tool 100 can be used in combination with an autoclave. In such examples, the tool 100 and the unheated composite material on the part-interface surface 104 of the tool 100 are put into an autoclave. The tool 100 uses a heat source to supply heat to aid in forming the composite part 101 on the part-interface surface 104. As described above, the heat source include the heating element 108, the fluid manifold 118, or both the heating element 108 and the fluid manifold 118. Furthermore, the autoclave supplies additional heat to heat the tool 100 and the composite part 101. In other words, heat is being generated to form the composite part 101 by the tool 100 and the autoclave. Therefore, the composite part 101 can be heated at a faster rate than using an autoclave alone.

Figure 3:
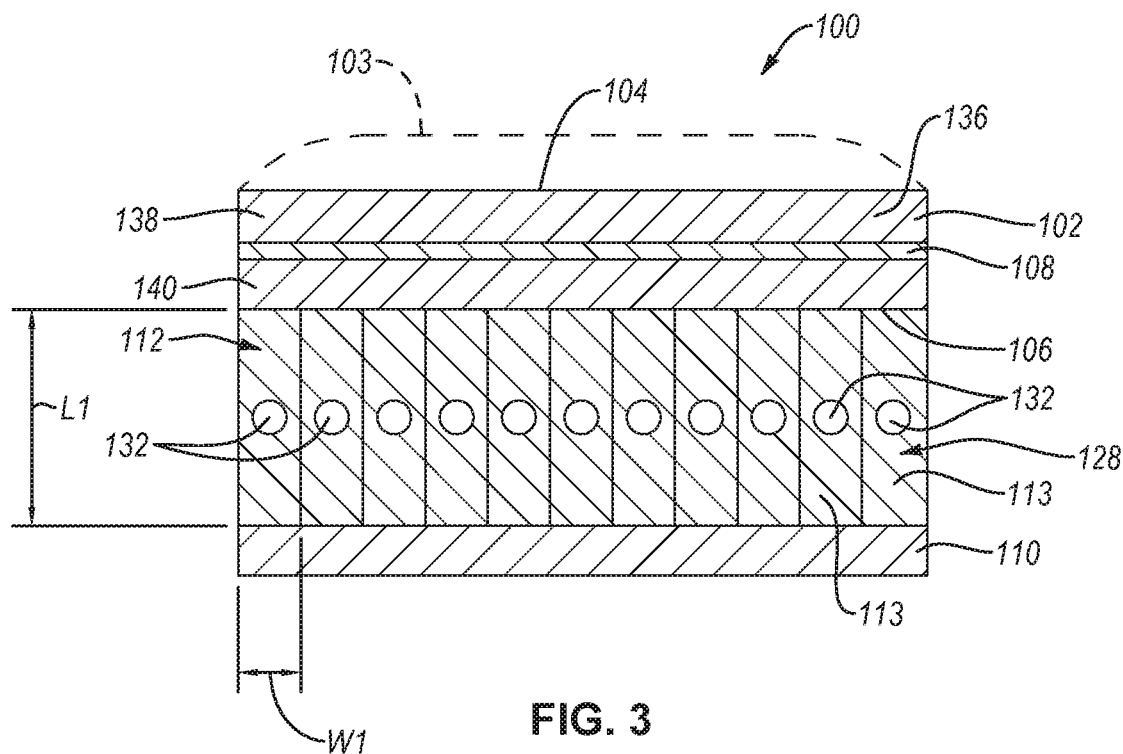
FIG. 3 is a schematic cross-sectional side view of a tool of FIG. 1, taken along the line 3-3 of FIG. 1, a composite part on the tool, according to one or more examples of the present disclosure.
Figure 4:
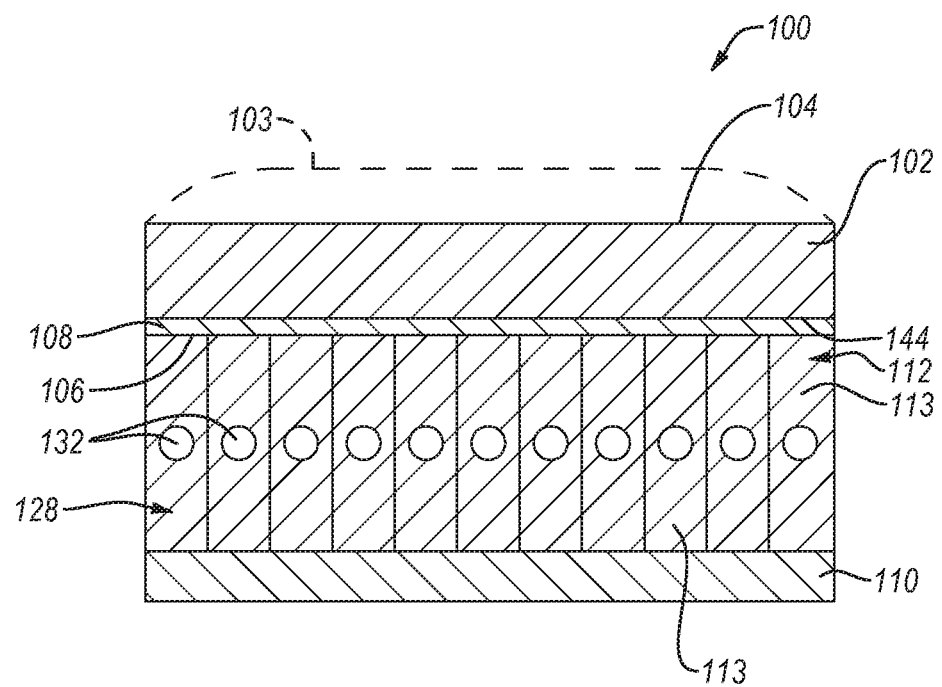
FIG. 4 is a schematic cross-sectional side view of a tool for forming a composite part, a composite part on the tool, according to one or more examples of the present disclosure.

Referring to FIG. 3-5, in certain examples, the heating element 108 of the tool 100 heats the first layer 102 and provides uniform temperature distribution across the part-interface surface 104 of the tool 100 to heat an unheated composite material 103. To promote a uniform thermal distribution of heat to the part-interface surface 104, the heating element 108 is located under the entirety or a substantial portion of the part-interface surface 104. The heating element 108 is parallel to the part-interface surface 104 and at a consistent distance from the part-interface surface 104, which promotes a uniform transfer of heat to the part-interface surface 104. In some examples, the heating element 108 provides resistive heating, such as via a resistive heating element (e.g., resistive film or resistive wires) that are parallel to and uniformly distributed under an entirety or a substantial part of the part-interface surface 104. Accordingly, a resistive heating element can be integrated into the first layer 102. In other examples, the heating element 108 is an inductive heating element, which can be integrated into the first layer 102.

The low-density core 112 is a honeycomb structure 128 (e.g., a honeycomb core) that is interposed between the core-interface surface 106 of the first layer 102 and the second layer 110. The honeycomb structure 128 gives the low-density core 112 a density less than the first layer 102 and the second layer 110. The honeycomb structure 128 includes the plurality of empty cells 130 formed between sidewalls 113, which are thin and vertical. Each one of the plurality of empty cells 130 extends lengthwise perpendicular to the first layer 102 and the second layer 110. In other words, the vertical sidewalls 113 extend from the core-interface surface 106 of the first layer 102 to the second layer 110. Therefore, the empty cells 130 are partially defined by the first layer 102 and the second layer 110. The sidewalls 113 have a length L1 perpendicular to the part-interface surface 104 (see, e.g., FIG. 3). Moreover, as also shown in FIG. 3, each one of the sidewalls 113 has a width W1 that is perpendicular to the length L1. The vertical sidewalls 113 provide stiffness to the tool 100 in a direction perpendicular to the first layer 102, or along the length L1 of the sidewalls 113. Changes to the length L1 and the width W1 of the sidewalls 113 can determined the rate of air flow through the low-density core 112 and the stability to the tool 100 provided by the low-density core 112. Therefore, the first layer 102, the honeycomb structure 128, and the second layer 110 form a sandwich panel with variable rigidity based on the structure of the empty cells 130 in the low-density core 112.

The empty cells 130 of the honeycomb structure 128 can have any of various shaped cross-sections alone a plane parallel to the first layer 102 (e.g., the part-interface surface 104) and the second layer 110. For example, the empty cells 130 may be circular or have a polygonal-shaped cross-section, such as triangular, pentagonal, or hexagonal. As shown in FIG. 6, in one example, all of the empty cells 130 have the same cross-sectional shape. But, in other examples, some of the empty cells 130 can have different cross-sectional shapes than other empty cells 130 of the low-density core 112. Additionally, the sizes of the empty cells 130 may be uniform or varied throughout the low-density core 112.

The honeycomb structure 128 can be produced from a composite material such as glass-fiber-reinforced polymer, carbon-fiber reinforced polymer, or paper-reinforced polymer. Additionally, the honeycomb structure 128 can be produced from a metal (such as aluminum or copper). The honeycomb structure 128 promotes the thermally conductivity of the low-density core 112, such as when the honeycomb structure 128 is made of a metal. The thermal conductivity of the low-density core 112 can help promote heat transfer to the part-interface surface 104. In this manner, the low-density core 112 can enhance the heat transfer performance of the tool 100.

As shown in FIG. 3, in certain examples, the first layer 102 is made of a composite material 136, such as a glass-fiber-reinforced polymeric material or a carbon-fiber-reinforced polymer material. The first layer 102 includes an upper composite layer 138 and a lower composite layer 140. The second layer 110 may be made of a composite material 136 or metallic material. A heating element 108 is interposed between the upper composite layer 138 and the lower composite layer 140. In some examples, the heating element 108 is integrally interposed between the upper composite layer 138 and the lower composite layer 140. For example, the heating element 108 is integrally interposed between the upper composite layer 138 and the lower composite layer 140 by the use of a resin (or other adhesive).

As shown in FIG. 4, in certain examples, the first layer 102 is made of a metallic material, such as, steel, aluminum, or Invar. The second layer 110 may be made of a composite material or a metallic material. A heating element 108 is coupled to a heat-element interface surface 144 of the first layer 102. In some examples, the heating element 108 is integrally coupled to the metallic material of the first layer 102. For example, the heating element 108 is integrally coupled to heat-element interface surface 144 of the first layer 102 by the use of an adhesive, welding or other mechanical connection. The metallic material has a relatively high thermal conductivity. Therefore, the uniform thermal distribution of heat to the part-interface surface 104 may be enhanced due to the thermal conductivity of the metallic material.

As shown in FIGS. 3-6, in some examples, the honeycomb structure 128 includes a plurality of fluid ports 132. Each one of the fluid ports 132 fluidically interconnects a corresponding set of adjacent empty cells 130 in the honeycomb structure 128. Accordingly, a plurality of fluid ports 132 help provide a fluid flow path through a set of empty cells 130 from the first side 114 of the low-density core 112 to the second side 115 of the low-density core 112. The low-density core 112 includes multiple sets of such empty cells 130 and fluid flow paths where each fluid flow path is separated from any other fluid flow path. In one example, the fluid ports 132 are defined by apertures formed in the sidewalls 113 of the honeycomb structure 128. The apertures can have any of various shapes and be in any of various positions on the sidewalls 113. For example, the aperture could be circular hole, square hole, or an elongated slit. As shown in FIGS. 3, 4, and 6, the fluid ports 132 are circular shaped and located in a middle portion of the sidewalls 113 between ends of the sidewalls. In contrast, according to other examples shown in FIG. 5, the fluid ports 132 are square shaped and located at the ends of the sidewalls 113. Accordingly, the low-density core 112 can have more than one aperture in each sidewall 113. Multiple apertures may improve uniformity of the temperature distribution across the part-interface surface 104 of the tool by increasing the amount of gas 120 or flow rate of the gas 120 into and through the low-density core 112. As illustrated, the fluid ports 132 of the low-density core 112 can all have the same size and shape. However, in other examples, the fluid ports 132 have different shapes to provide local customization of the gas 120 flow through the low-density core 112. The apertures can be located at any of various locations in the sidewalls 113. For example, in FIG. 5, for a given sidewall 113, one aperture is at the core-interface surface 106 and another aperture is at the second layer 110. Alternatively, in FIGS. 3-4 each aperture is shown near the middle of the corresponding sidewall 113.

In some examples, the fluid port 132 is a slit or carved out section in the honeycomb structure 128 that extends from the first side 114 of the low-density core 112 to the second side 115 of the low-density core 112. The opening of the slit or carved out section in the honeycomb structure 128 may extend from the core-interface surface 106 to the second layer 110. In one example, the slits or carved out sections are spaced uniformly throughout the low-density core 112. In another example, the slits or carved out sections are spaced non-uniformly throughout the low-density core 112, this pattern may provide local customization of heat transfer to the tool 100.

Referring to FIG. 6, which shows the honeycomb structure 128 of the low-density core 112, the empty cells 130 in the honeycomb structure 128 are arranged in rows of empty cells 130, where each row extends across the a width W of the low-density core 112. Generally, the width W of the low-density core 112 is defined by the side of the low-density core 112 that is the shortest. Although each row extends across the width W of the low-density core 112 in FIG. 6, in other examples, each row extends across the a length L of the low-density core 112. The length L of the low-density core 112 is defined by the side of the low-density core 112 that is the longest. Accordingly, the rows of empty cells 130 extend along either a length L or width W of the low-density core 112 depending on which side the rows are parallel to and whether that side is longer or shorter than an adjacent side.

Any one row of empty cells 130 may be arranged adjacent to another one row or two rows of empty cells 130. In one example, as not shown, a first row of empty cells 130 is directly aligned with a second row of empty cells 130 (i.e. an empty cell in the first row is in parallel alignment with an adjacent empty cell in the second rows) and the pattern of rows may be repeated through the honeycomb structure 128. In other examples, as shown, a first row of empty cells 130 is offset (e.g. staggered, out-of-phase, or otherwise misaligned) with a second row of empty cells 130 and the pattern of rows may be repeated throughout the honeycomb structure 128. For example, the first row of empty cells 130 along the length L or width W of the honeycomb structure 128 is offset from the second row of empty cells 130 along the length L or width W of the honeycomb structure 128. Accordingly, the pattern of rows of offset empty cells 130 in honeycomb structure 128 is continued throughout the structure.

The empty cells 130 in the honeycomb structure 128 have a hexagonal-shaped cross-section 133. The empty cells 130, with the hexagonal-shaped cross-section 133, are adjacent to other empty cells 130 in both direct alignment and offset alignment. The fluid port 132 fluidically interconnects empty cells 130 to adjacent empty cells 130. The fluid port 132 is an aperture in the empty cells 130, in this case the aperture is a hole in the sidewalls 113 of the empty cells 130. The adjacent empty cells 130 may be empty cell 130 in an offset alignment or may be empty cells 130 in direct alignment. In some examples, each empty cell 130 may have a fluid port 132 with one adjacent empty cell 130. Alternatively, each empty cell 130 may have multiple fluid ports 132 to multiple empty cells 130 (e.g. a fluid port to two offset empty cells). As such, the empty cell 130 is in fluid communication to at least one other adjacent empty cell 130. The fluid ports 132 create a path of fluid communication of empty cells 130 from the first side 114 to the second side 115 of the honeycomb structure 128 by interconnecting adjacent empty cells 130.

The sides of the low-density core 112 extending between the first side 114 and the second side 115 are closed (i.e. the sides do not have any opening). In one example, each closed side of the honeycomb structure 128 includes a row of sidewalls 113 of the honeycomb structure 128 without fluid ports. In another example, each closed side of the honeycomb structure 128 includes a wall thicker than that of each one of the sidewalls 113. By having closed sides, the gas 120 that is forced into the honeycomb structure 128 at the first side 114 (or first end) must flow from the first side 114 to the second side 115 (or second end) of the honeycomb structure 128. In other words, gas 120 can enter and exit the honeycomb structure 128 at the first side 114 and second side 115, but cannot enter or exit the honeycomb structure 128 along the closed sides.

Figure 7A:
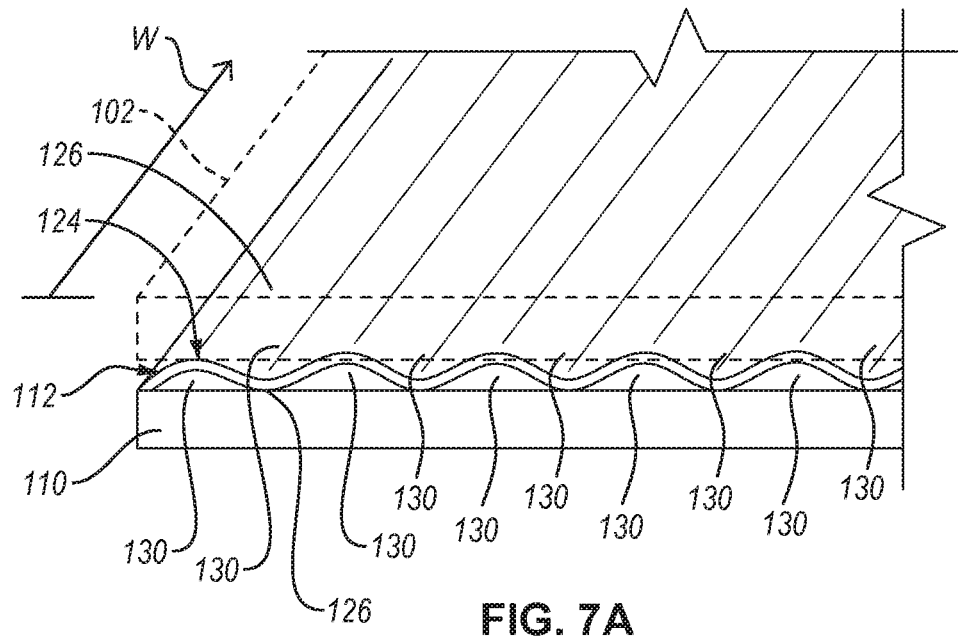
FIG. 7A is a schematic perspective view of a tool for forming a composite part, according to one or more examples of the present disclosure.
Figure 7B:
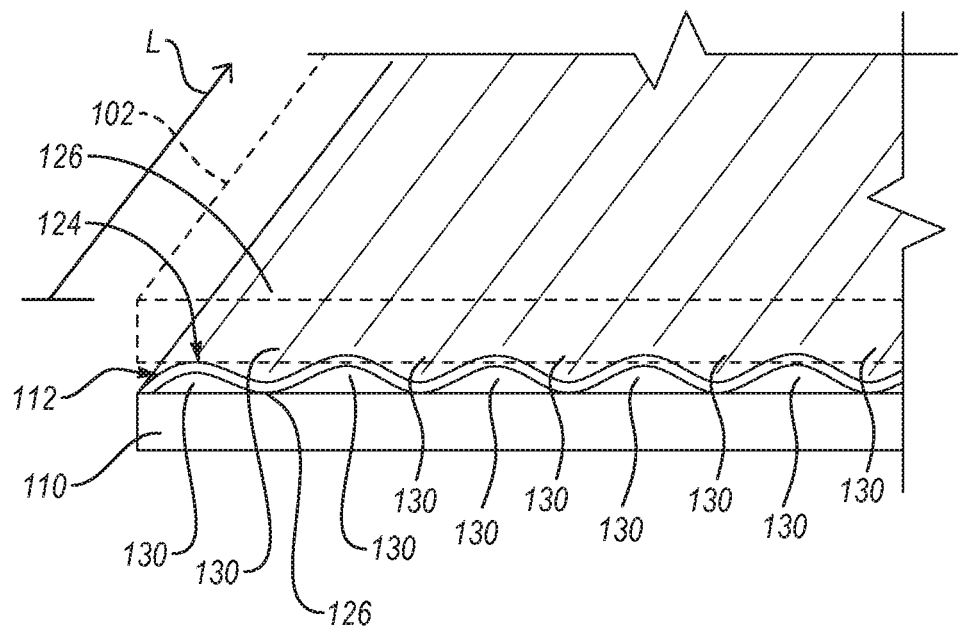
FIG. 7B is a schematic perspective view of another tool for forming a composite part, according to one or more examples of the present disclosure.

Referring to FIG. 7A, in some examples, the low-density core 112 is a corrugated panel 124 that includes a plurality of corrugations 126. The corrugated panel 124 is interposed between the core-interface surface 106 of the first layer 102 and the second layer 110. The corrugated panel 124 gives the low-density core 112 a density less than the first layer 102 and the second layer 110. The corrugated panel 124 has a plurality of empty cells 130. The plurality of empty cells 130 are partially defined by the plurality of corrugations 126. Additionally, the plurality of corrugations 126 are partially defined by the first layer 102 and the second layer 110. Each one of the corrugations 126 in the corrugated panel 124 defines a corresponding one of the empty cells 130 and extend lengthwise parallel with the first layer 102 and the second layer 110. In one example, as shown in FIG. 7A, the corrugations 126, and the empty cells 130, extend across the width W of the first layer 102 and the second layer 110. However, in other examples, as shown in FIG. 7B, the corrugations 126, and the empty cells, extend across the length L of the first layer 102 and the second layer 110. The size of the corrugations 126 can be uniform or varied throughout the corrugated panel 124.

The corrugated panel 124 can be produced from a composite core material such as glass-fiber-reinforced composite, carbon-fiber reinforced composite, or paper-reinforced composite. Additionally, the corrugated panel 124 can be produced from a metal (usually aluminum). Moreover, the corrugated panel 124 can have a thermally conductivity. The thermal conductivity of the corrugated panel 124 can help promote heat transfer to the part-interface surface 104.

Figure 8A:
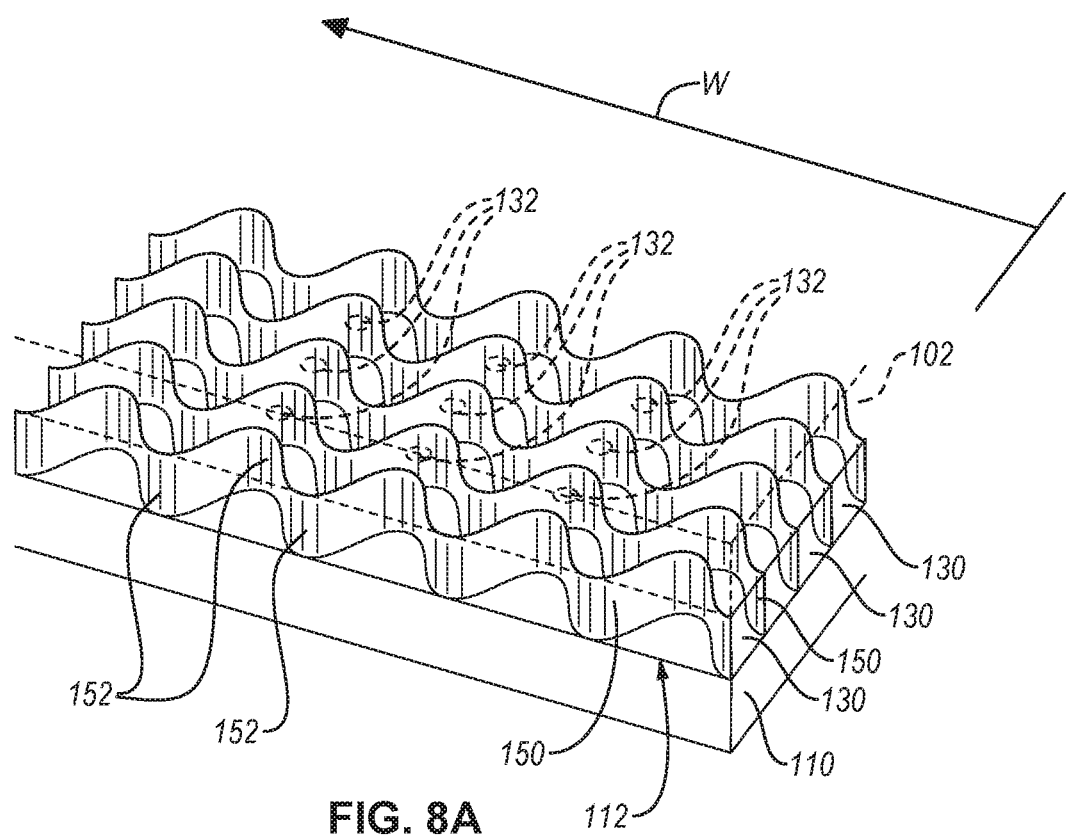
FIG. 8A is a schematic perspective view of yet another tool for forming a composite part, according to one or more examples of the present disclosure.
Figure 8B:
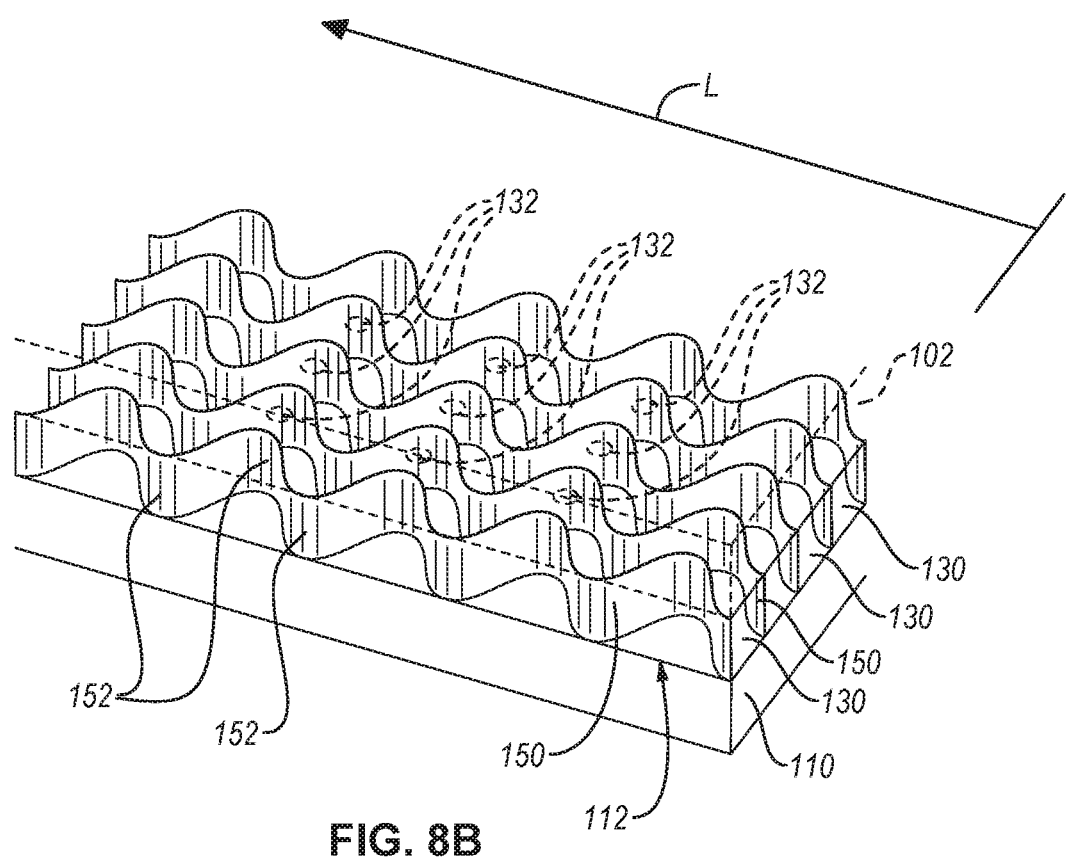
FIG. 8B is a schematic perspective view of an additional tool for forming a composite part, according to one or more examples of the present disclosure.

Referring to FIG. 8A, in some examples, the low-density core 112 includes a plurality of corrugated strips 150 spaced apart from each other and interposed between the first layer 102 and second layer 110. The space defined between corresponding adjacent ones of the corrugated strips 150 define an empty cell 130 and a plurality of corrugated strips 150 partially define a plurality of empty cells 130. Additionally, the plurality of empty cells are partially defined by the first layer 102 and the second layer 110. In one example, as shown in FIG. 8A, the plurality of corrugated strips 150 and each one of the plurality of empty cells 130 extends across the width W of the first layer 102 and the second layer 110. However, in other examples, as shown in FIG. 8B, the plurality of corrugated strips 150 and each one of the plurality of empty cells 130 extends across the length L of the first layer 102 and the second layer 110.

Each one of the corrugated strips 150 includes a plurality of corrugations 152. The corrugations 152 of the corrugated strips 150 extends lengthwise perpendicular to the first layer 102 and the second layer 110. The number of corrugations 152 in a corrugated strip can be varied, with the number of corrugations 152 changing the flow rate of gas 120 through the low-density core 112 and also adjusting the stiffness of the low-density core 112 in a direction perpendicular to the first layer 102. Additionally, the corrugated strips 150 can be identical, having the same number of corrugations 152 in each corresponding corrugated strip 150. Alternatively, the corrugated strips 150 can be distinct and have varying number of corrugations 152 in adjacent corrugated strips 150.

In some examples, the low-density core 112 can have a plurality of empty cells 130 that extends across a width W or length L of the first layer 102 and the second layer with adjacent empty cells 130 of the plurality of empty cells 130 fluidically interconnected by a fluid port 132 formed in the low-density core 112. As shown in FIG. 8, the corrugated strips 150 include a plurality of fluid ports 132 that further fluidically interconnect adjacent empty cells 130 in the low-density core 112. The fluid ports 132 are defined by apertures formed in the corrugated strips 150 and may be any of various shapes. The addition of fluid ports 132 to the corrugated strips 150 can improve uniformity of the temperature distribution across the part-interface surface 104 of the tool 100.

Figure 9:
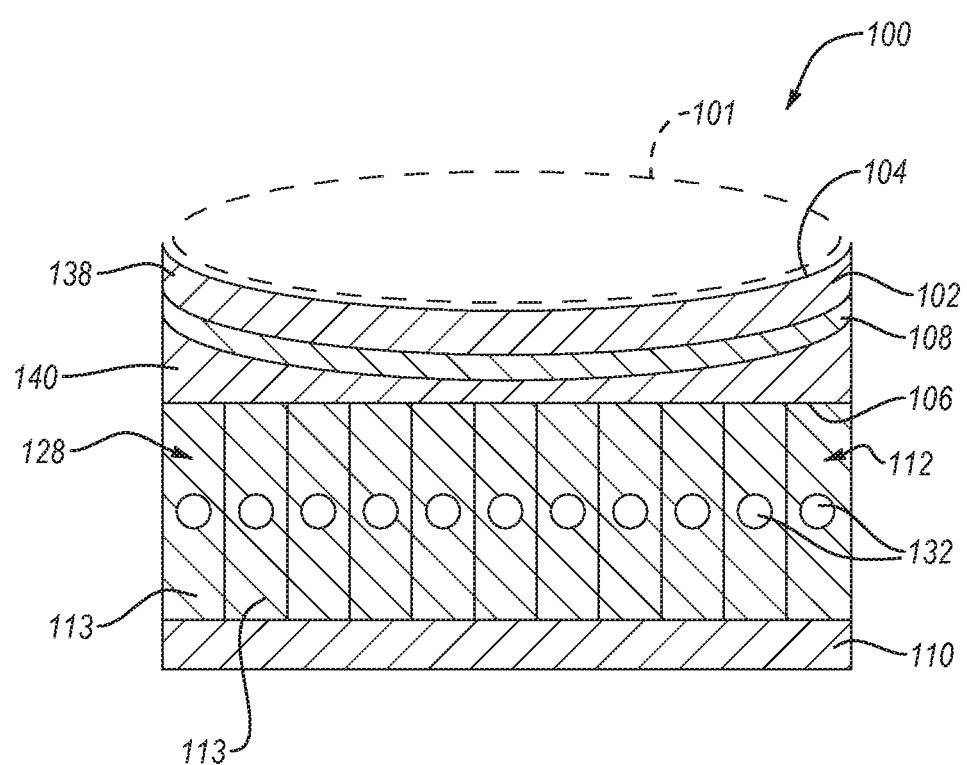
FIG. 9 is a schematic cross-sectional side view of a tool for forming a composite part, a composite part on the tool, according to one or more examples of the present disclosure.

As shown in FIG. 9, the part-interface surface 104 complements the shape of the composite part 101. In examples where the composite part 101 is contoured, the part-interface 104 is correspondingly contoured. The shape of the part-interface surface 104 is inverted relative to the shape of the composite part 101. In other words, concavities in the part-interface surface 104 correspond to convexities in the composite part 101 and convexities in the part-interface surface 104 correspond to concavities in the composite part 101. Because the part-interface surface 104 is in direct contact with the composite part 101, heat is transferred directly from the part-interface surface 104 to the composite part 101. Accordingly, the thermal distribution at the part-interface surface 104 translates into the thermal distribution in the composite part 101. Therefore, a uniform thermal distribution at the part-interface surface 104 will translate into a uniform thermal distribution into the composite part 101.

Figure 10:
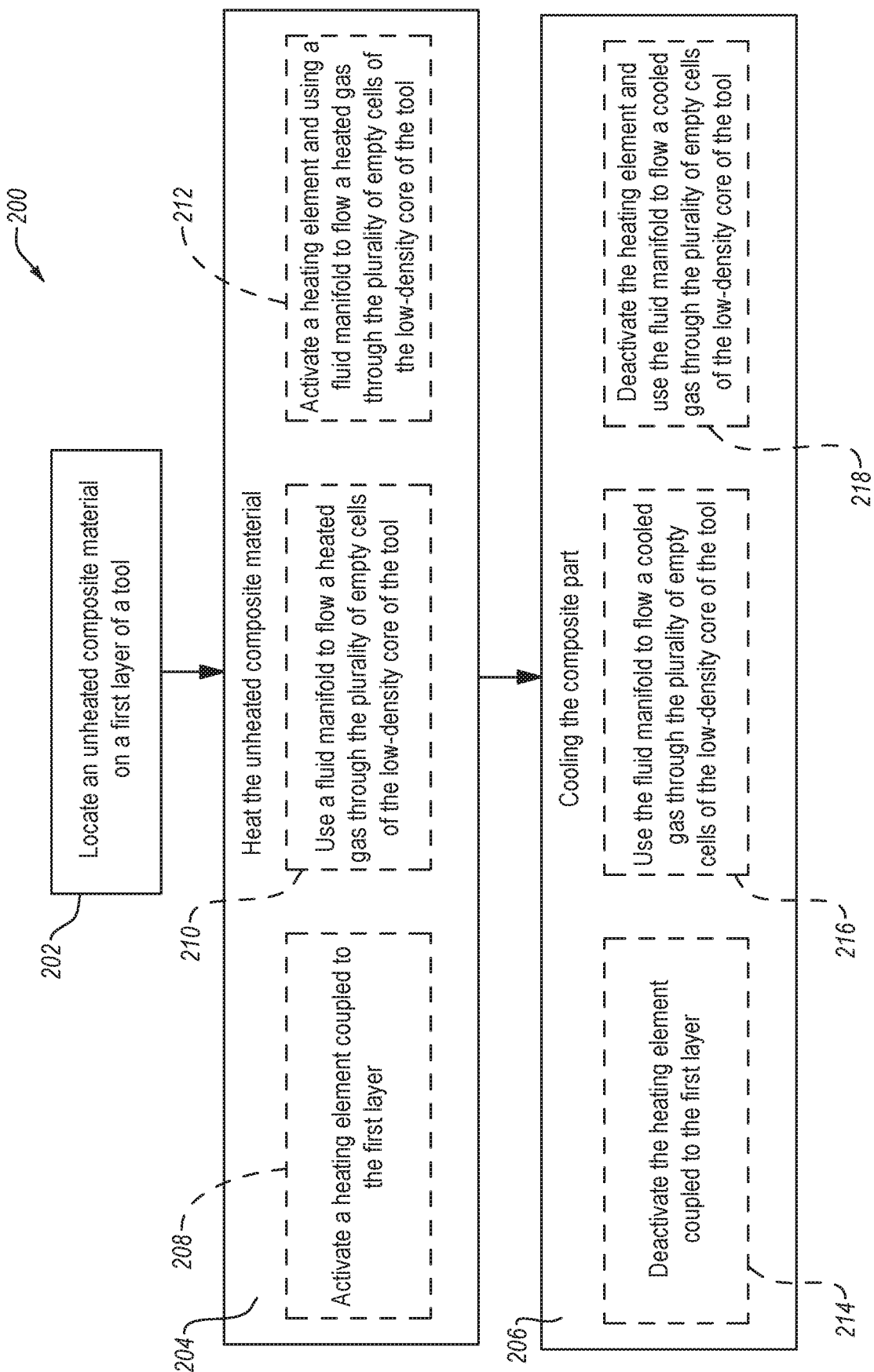
FIG. 10 is a schematic flow diagram of a method of forming a composite part using a tool, according to one or more examples of the present disclosure.

Referring to FIG. 10, according to certain examples, a method 200 of forming a composite part 101 using the tool 100 is shown. The method 200 includes (block 202) locating an unheated composite material on the first layer 102 of the tool 100. The method 200 also includes (block 204) heating the unheated composite material to form a heated composite part 101. The method 200 further includes (block 206) cooling the heated composite part 101.

In some examples, the step of heating the unheated composite material includes (block 208) activating the heating element 108 coupled to the first layer 102 and the step of cooling the forming composite part 101 includes (block 214) deactivating the heating element 108 coupled to the first layer 102.

In other examples, the step of heating the unheated composite material includes (block 210) using the fluid manifold 118 to flow a heated gas through the plurality of empty cells 130 of the low-density core 112 of the tool 100 and the step of cooling the heated composite part 101 includes (block 216) using the fluid manifold 118 to flow a cooled gas through the plurality of empty cells 130 of the low-density core 112 of the tool 100. According to certain examples, the block 204 and the block 206 of the method 200 includes only block 208 and 214, respectively, and does not include block 210 and block 216, respectively. Alternatively, in other examples, the block 204 and the block 206 of the method 200 includes only block 210 and block 216, respectively, and does not include block 208 and block 214, respectively.

In certain examples, the step of heating the unheated composite material includes (block 212) activating the heating element 108 coupled to the first layer 102 and flowing a heated gas through the plurality of empty cells 130 of the low-density core 112 of the tool 100. In the same examples, the step of cooling the heated composite part 101 includes (block 218) deactivating the heating element 108 coupled to the first layer 102 and flowing a cooled gas through the plurality of empty cells 130 of the low-density core 112 of the tool 100.

According to certain examples, the method 200 further includes selectively activating the heating element 108 while flowing cooled gas through the low-density core 112. Activating the heating elements 108 to generate heat during forced-gas cooling helps to control the cool-down ramp of the composite part 101 to predetermined rate so that cooling of the composite part 101 is not done too quickly or unevenly, which can result in residual stress or microcracking/fractures in the composite part 101.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A tool for forming a composite part, the tool comprising:
   a first layer, comprising a part-interface surface and a core-interface surface, the part-interface surface being opposite the core-interface surface;
   a heating element, coupled to the first layer, the heating element being configured to supply heat to the first layer;
   a second layer, spaced apart from the first layer; and
   a low-density core, interposed between the first layer and the second layer such that the core-interface surface and the second layer interface with the low-density core, the low-density core having a density less than the first layer and the second layer, wherein the low-density core comprises a plurality of corrugated sidewalls each having a plurality of corrugations;
   wherein:
      each one of the plurality of corrugated sidewalls extends continuously from respective first ends of the first layer and the second layer, across an entire width or an entire length of the first layer and the second layer, to respective second ends of the first layer and the second layer, which are opposite the first ends of the first layer and the second layer, respectively;
      the first layer, the second layer, and adjacent ones of the plurality of corrugated sidewalls at least partially define each one of a plurality of channels;
      each one of the plurality of corrugated sidewalls directly contacts the first layer and the second layer;
      each one of the plurality of corrugated sidewalls is perpendicular to the first layer and the second layer;
      each one of the plurality of channels extends across one of the entire width or the entire length of the first layer and the second layer; and
      the plurality of channels occupies an entirety of space between the first layer and the second layer, and fluid is flowable through the plurality of channels such that the fluid occupies the entirety of the space between the first layer and the second layer.

2. The tool according to claim 1, wherein each one of the plurality of channels comprises an inlet, which is arranged at the respective first ends of the first layer and the second layer, and an outlet, which is arranged at the respective second ends of the first layer and the second layer, such that fluid is flowable, through each one of the plurality of channels, from the inlet to the outlet across the one of the entire width or the entire length of the first layer and the second layer.

3. The tool according to claim 2, further comprising a fluid manifold, comprising a fluid manifold inlet fluidically coupled with the inlets of the plurality of channels and comprising a fluid manifold outlet fluidically coupled with the outlets of the plurality of passages, wherein the fluid manifold is configured to force a gas into and through the low-density core.

4. The tool according to claim 3, wherein the gas has a temperature less than or higher than the first layer.

5. The tool according to claim 3, wherein the fluid manifold is operable to modulate a temperature of the gas forced into and through the low-density core between a first temperature lower than the first layer and a second temperature higher than the first layer.

6. The tool for according to claim 1, wherein adjacent ones of the plurality of channels are fluidically interconnected by one or more fluid ports formed in the plurality of corrugated sidewalls of the low-density core.

7. The tool according to claim 1, further comprising a backup support structure attached to the second layer.

8. The tool according to claim 7, wherein the backup support structure is made of a metallic material.

9. The tool according to claim 1, wherein the heating element comprises a resistive heating element integrated into the first layer.

10. The tool according to claim 1, wherein the heating element comprises an inductive heating element integrated into the first layer.

11. The tool according to claim 1, wherein:
    the first layer is made of a composite material and comprises an upper composite layer and a lower composite layer; and
    the heating element is interposed between the upper composite layer and the lower composite layer.

12. The tool according to claim 1, wherein:
    the first layer is made of a metallic material; and
    the heating element is coupled to the core-interface surface of the first layer.

13. The tool according to claim 1, wherein:
    the part-interface surface of the first layer has at least one contour; and
    the at least one contour of the part-interface surface of the first layer corresponds with a contour of the composite part.

14. The tool according to claim 1, wherein fluid is flowable through the low-density core from one side of the low-density core to an opposite side of the low-density core by at least one of:
    flowing along a same one of the plurality of channels; or
    flowing through multiple ones of the plurality of channels via a plurality of fluid ports formed in the low-density core.

15. The tool according to claim 1, wherein:
    each one of the plurality of corrugated sidewalls extends continuously from respective first ends of the first layer and the second layer, across the entire width of the first layer and the second layer, to respective second ends of the first layer and the second layer; and
    each one of the plurality of channels extends across the entire width of the first layer and the second layer.

16. The tool according to claim 1, wherein:
    each one of the plurality of corrugated sidewalls extends continuously from respective first ends of the first layer and the second layer, across the entire length of the first layer and the second layer, to respective second ends of the first layer and the second layer; and each one of the plurality of channels extends across the entire length of the first layer and the second layer.

17. The tool according to claim 1, wherein:

the first layer has a contoured surface; and the heating element has a contoured surface that corresponds to the contoured surface of the first layer.

18. The tool according to claim 1, wherein the heating element is a consistent distance from the part-interface surface of the first layer.

19. The tool according to claim 1, wherein the tool is configured to be heated at a rate of 10 degrees Fahrenheit per minute or higher by the heating element.

20. The tool according to claim 1, wherein the heating element comprises a resistive film or resistive wires.

\* \* \* \* \*